Feb. 17, 1925.
S. S. GRADY
MECHANICAL MOVEMENT AND ELECTRIC SWITCH
Original Filed March 2, 1923
1,526,474
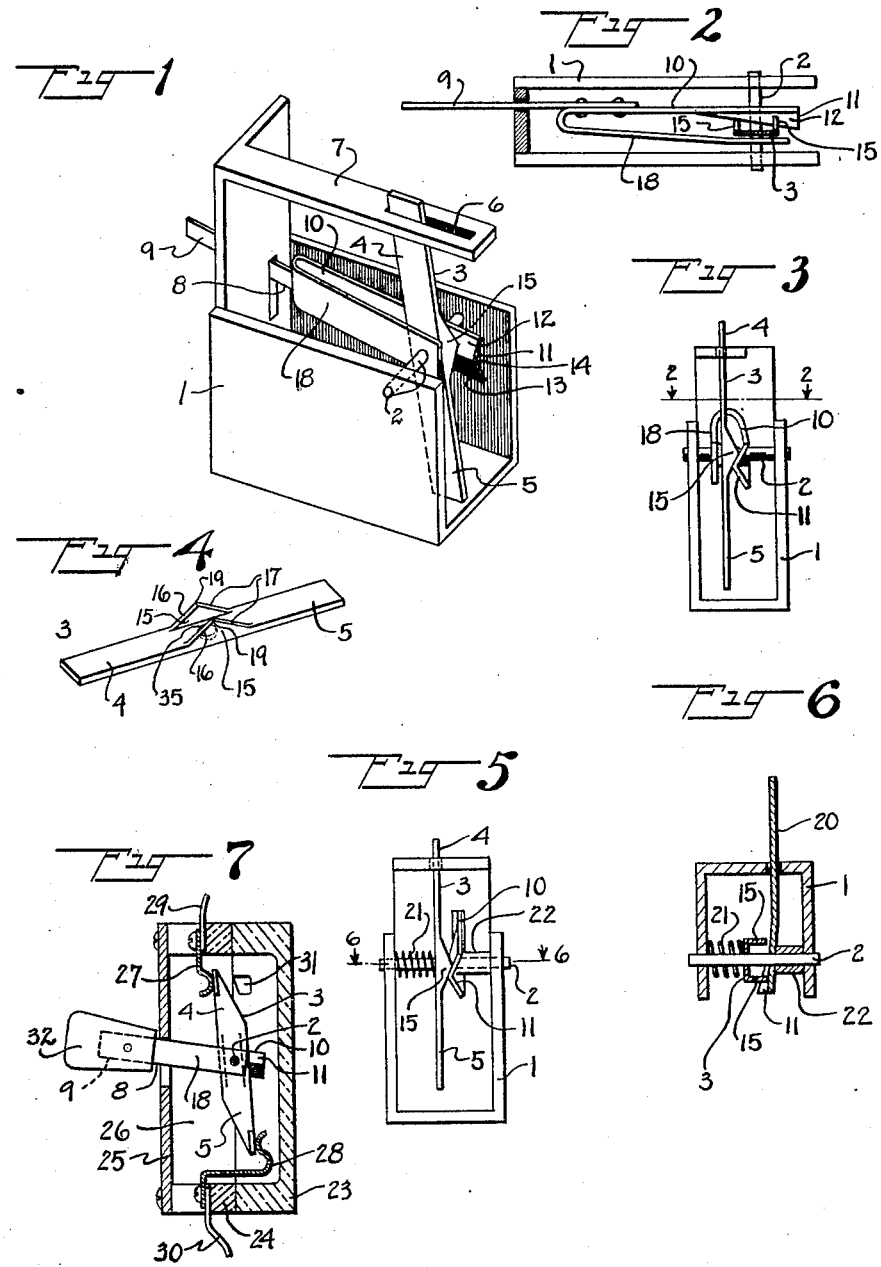

Patented Feb. 17, 1925.

1,526,474

UNITED STATES PATENT OFFICE.

STEPHEN S. GRADY, OF NEWTONVILLE, MASSACHUSETTS, ASSIGNOR, BY MESNE ASSIGNMENTS, TO METEOR ELECTRIC CORPORATION, OF NEW YORK, N. Y., A CORPORATION OF NEW YORK.

MECHANICAL MOVEMENT AND ELECTRIC SWITCH.

Original application filed March 2, 1923, Serial No. 622,352. Divided and this application filed March 2, 1923. Serial No. 622,353.

*To all whom it may concern:*

Be it known that I, STEPHEN S. GRADY, a citizen of the United States, residing at Newtonville, in the county of Middlesex and State of Massachusetts, have made certain new and useful Improvements in Mechanical Movements and Electric Switches, of which the following is a specification taken in connection with the accompanying drawings.

This application is a division of my co-pending application, Case A, Ser. No. 622,352, filed herewith.

My invention relates to a mechanical movement.

My invention further relates to an electric wall switch, or to any electric switch, wherein the contacts are connected and disconnected by a quick and positive snap by means of my mechanical movement.

My invention further relates to certain details of construction, articles of manufacture, combinations and sub-combinations, which will be more fully hereinafter described in the specification and pointed out in the claim.

In the accompanying drawings the same reference numerals refer to similar parts in the several figures.

Fig. 1 is a perspective view of my mechanical movement;

Fig. 2 is a horizontal plan view, substantially on the line 2—2 of Fig. 3;

Fig. 3 is a rear end elevation;

Fig. 4 is a perspective view of the rigid driven member;

Fig. 5 is a rear elevation showing a modification;

Fig. 6 is a detail sectional view on the line 6—6 of Fig. 5.

Fig. 7 is a sectional view showing my mechanical movement as the operating mechanism of an electric wall switch.

In the illustrative embodiments of my invention shown in the drawings, 1 is a box or support in which is mounted the axle 2. On this axle I mount the rigid driven member 3. This driven member is provided with arms 4 and 5. The upper arm 4 is preferably located in a slot 6 in the member 7 of the box or support 1.

On the same axle 2 I mount the driving member 8, which in the form shown in Fig. 1, is a lever, having an actuating arm 9 and a driving arm 10. This driving arm is provided with a convex surface 11, preferably by bending the driving arm so as to have the two inclined surfaces 12 and 13 meeting at the point 14.

The rigid driven member 3 is preferably stamped from sheet metal and has struck-up convex surfaces 15, 15 formed of inclined surfaces 16, 16 and 17, 17 meeting at the points 19, 19. The driven member is also provided with an opening 35 for the reception of the axle 2.

When the parts are mounted in the box or support 1, the cooperating convex surfaces 15, 15 are brought into engagement with the cooperating convex surfaces 11 on the driving arm 10 of the lever 8.

I also employ any suitable resilient means to cause these convex surfaces to stay in engagement. In the drawings I have illustrated different resilient or spring members, to accomplish this purpose, though it is of course to be understood that my invention is not to be confined to the particular ones shown by way of illustration.

In the form shown in Figs. 1 to 3 the resilient member, for accomplishing this purpose, is a spring member 18 carried by the lever 8. In Fig. 1, this resilient member 18 is integral with the driving member which is shown bifurcated, the rigid driven member 3 being mounted between the driving arm 10 and the spring arm 18 of the lever 8, both arms being pivoted upon the axle 2.

It will be clear that as the actuating arm 9 is raised or lowered, the rigid driven member 3 will be caused to snap back and forth in its slot 6. From the position shown in Fig. 1, by pressing down upon the actuating arm 9, the lever is caused to rock upon the axle 2 which will make the inclined surface 12 slide upon the inclined surfaces 16, 16 of the driven member 3. This movement will cause the spring arm 18 of the lever 8 to be placed under pressure, which will be released the moment that the point 14 on the driving arm 10 passes the points 19, 19 on the convex surfaces 16, 16 of the driven member 3. The moment that this occurs the spring action, stored up in the spring 18, will cause the rigid driven member 3 to rock with a sharp quick snap, from the position shown in Fig. 1, to its opposite position where the arm 4 will engage with the opposite extremity of the slot 6. By then pulling up upon the actuating arm 9 the action will be reversed, and the parts brought back with a snap into the position shown in Fig. 1.

Instead of using a bifurcated driving member, or a driving member on which is mounted the spring member, as for example in Figs. 1 to 3, I may, in some cases, not only mount the spring upon the axle 2, as it is mounted in Fig. 1, but I may also have it independent of the driving member or lever. I have shown such a modification in Figs. 5 and 6 in which the driving lever 20 is a single arm provided with the convex surface 11 and cooperating with the convex surfaces 15, 15 of the driven member 3. In this construction, however, the resilient or spring member 21 is a coiled spring, which is mounted around the axle 2 and serves to press the convex surfaces of the driving and driven members together. In all forms I preferably employ a sleeve 22 on the axle 2 to prevent the driving arm of the lever from being moved laterally.

It is clear that my mechanical movement can be used as the operating mechanism of an electric switch, by having the driven member make and break the current between the fixed electric contacts of any form of electric switch.

I have shown one such embodiment of my invention, more or less diagrammatically, in Fig. 7, which is a wall switch having the two porcelains 23, 24 and face or escutcheon plate 25. Within the opening or chamber 26, I mount the fixed contacts 27 and 28 connected, respectively, to the electric wires 29 and 30.

On the axle 2 I mount the rocking contact driven member 3, which in one position, connects the fixed contacts 27 and 28 so as to turn the current on. In the reverse position the rocking driven contact member 3 is disconnected from the fixed contacts 27 and 28 by a sharp quick snap and thrown over into contact with the stop 31; the switch then being in its off position.

On the same axle 2, I mount the driving member 8 having the driving arm 10, the resilient arm 18, and the actuating arm 9, this latter arm being covered with insulation 32. The operation of the switch shown in Fig. 7 is exactly the same as the operation of the mechanical movement shown in Fig. 1, except that in this figure the rocking movement of the driven contact member 3 is limited in one direction by the fixed electrical contacts 27 and 28, and in the opposite direction by the stop 31.

It will be seen that both my mechanical movement and my electric switch are simple, made of few parts, can be cheaply manufactured and that when the mechanical movement is employed in any electric switch, the electrical connections will be made or broken by a quick positive snap. While I have shown my invention applied to but one form of electric switch, it is of course to be understood that it is adapted to be employed with any form of electric switch, the particular form being shown simply by way of illustration.

Having thus described this invention in connection with illustrative embodiments thereof, to the details of which I do not desire to be limited, what is claimed as new and what is desired to secure by Letters Patent is set forth in the appended claim.

What I claim is:—

In a mechanical movement the combination of an axle, a driven member mounted on the axle and provided with a convex operating surface, a bifurcated driving member mounted on the axle, one arm of the driving member being provided with a convex actuating surface in engagement with the convex surface on the driven member, the other arm of the driving member adapted to yieldingly press the driven member into engagement with the arm provided with the convex surfaces.

STEPHEN S. GRADY.

Witnesses:
ALAN M. JOHNSON,
GLADYS VAN LOAN.